United States Patent Office 3,326,972
Patented June 20, 1967

3,326,972
PREPARATION OF TRANS - HEXAHYDRO - TEREPHTHALIC ACID BY HYDROGENATION OF A TEREPHTHALIC ACID SALT IN THE PRESENCE OF A CIS-HEXAHYDRO TEREPHTHALIC ACID SALT
Walter Schenk, Bad Duerkheim, Georg Schiller, Mannheim, and Hans Nienburg, Ludwigshafen (Rhine), Germany, assignors to Badische Anilin- & Soda-Fabrik Aktiengesellschaft, Ludwigshafen (Rhine), Germany
No Drawing. Filed May 21, 1963, Ser. No. 282,133
Claims priority, application Germany, May 26, 1962, B 67,424
3 Claims. (Cl. 260—514)

This invention relates to the hydrogenation of salts of phthalic acids to hexahydrophthalic acids and more specifically to a process by which the cis-trans isomer behavior of hexahydrophthalic acids may be influenced.

It is known that in the hydrogenation of phthalic acids or their derivatives, a mixture of cis-trans isomers is obtained. The ratio between cis- and trans-forms can be shifted according to the conditions used. When using platinum oxide catalysts, it is even possible in the production of 1,4-hexahydropthalic acid to obtain the cis-compound exclusively. On the other hand no method for the hydrogenation of terephathalic acid has yet become known in which the hydrogenation can be directed so that the trans-form of 1,4-hexahydrophthalic acid is formed. Methods have however already been described by which it is possible to convert one of the two isomeric forms into a mixture of the cis- and trans-forms, for example treatment with mineral acids at elevated temperature and/or irradiation with ultraviolet light. Since the products of these methods are mixtures which must be separated and since the yields are poor, it is rather troublesome and wasteful to prepare one of the two unitary isomeric forms.

It is an object of this invention to provide a process for the hydrogenation of phthalic acids to hexahydrophthalic acids in which the ratio of the cis-trans isomers of hexahydrophthalic acids formed can be influenced. It is another object of this invention to provide a process for the production of hexahydrophthalic acids in which mainly the cis isomer or mainly the trans isomer can be prepared. A further object of this invention is to provide a hydrogenation process for phthalic acids in which the yields of one or other of the isomers of the corresponding hexahydrophthalic acids are very high. Further objects and advantages of the present invention will be apparent from the following description and examples.

We have found that in the catalytic hydrogenation of salts of phthalic acids to salts of the corresponding hexahydrophthalic acids at 120° to 350° C., the ratio of the cis-form to the trans-form can be influenced by carrying out the hydrogenation of a salt of a phthalic acid or a partial hydrogenation product thereof as formed during the reaction after first having added to the initial phthalic acid salt reactant a salt of the corresponding hexahydrophthalic acid which is not desired. The mixture thus obtained can be separated into the isomers in the form of salts or in the form of free hexahydrophthalic acids after the addition of acid.

The term "phthalic acid" as used in this application includes all the three isomers, namely o-, m- and p-phthalic acids. The partial hydrogenation products which are formed during the reaction are the appropriate cyclohexadiene and cyclohexene dicarboxylic acids. For the sake of simplicity we will hereinafter refer only to the phthalic acids but it is to be understood that the partial hydrogenation products are also included to the extent that they are formed during the reaction.

The conditions for the hydrogenation are conventional. For example the phthalic acid in the form of a salt of an alkali metal or a metal of Group IIB of the Periodic System (Handbook of Chemistry and Physics, 39th ed., Cleveland, Ohio, pp. 394–395) is hydrogenated while dissolved in a solvent or finely dispersed in solid form in a diluent, in the presence of catalysts with hydrogen or gases containing the same, for example by forcing the latter onto a shaken or agitated mixture of catalyst and phthalate. The solution may obviously also be prepared from the free acids and metal hydroxides, oxides or carbonates, particularly alkali metal and alkaline earth metal hydroxides, oxides or carbonates. Examples of suitable initial materials are the sodium, potassium, lithium, magnesium, calcium, strontium, aluminum, zinc or cadmium salts of o-phthalic acid, isophthalic acid or terephthalic acid, and also of 1,2-, 1,3-, 1,4-teterahydrophthalic acids (cyclohexene dicarboxylic acids) or 1,2-, 1,3- or 1,4-dihydrophthalic acids (cyclohexadiene dicarboxylic acids). The process is well suited for the hydrogenation of salts of aromatic dicarboxylic acids obtained by thermal rearrangement of potassium salts or aromatic dicarboxylic acids in the presence of cadmium or zinc catalysts. In most cases the process is carried out in aqueous solution. It may however be carried out in alcoholic solution, particularly in saturated monohydric alkanols, for example in methanol or ethanol. Examples of other solvents are saturated cyclic ethers, such as dioxane, tetrahydrofuran, polyhydric alcohols, such as ethylene glycol, or cycloalkanes, such as cyclohexane, and also alkanes, such as hexane, octane or lower alkane carboxylic acids, such as acetic acid or propionic acid.

The concentration of the phthalates in the solution or suspension may vary within wide limits. It is preferred to use solutions which are not too dilute. For example solutions having a concentration of 10 to 70%, particularly 35 to 60%, have proved to be suitable.

Catalysts which are suitable for hydrogenation of benzene dicarboxylic acids in the liquid phase are used, for example precious metal catalysts, particularly platinum, palladium, ruthenium and/or rhodium. Oxidic catalysts may however also be used, for example nickel-chromium oxide, if desired on pumice, copper-chromium oxide, cobalt oxide or nickel-cobalt-manganese oxide. Metallic cobalt or nickel catalysts are also suitable either in the form of sintered catalysts or in the form of skeleton catalysts such as are known as Raney catalysts, or in the form of nickel-aluminum oxide or nickel-chromium oxide catalysts. The catalysts are usually finely dispersed in the solution or suspension of the phthalic acid. The catalysts may however be rigidly arranged and a solution of the phthalate allowed to trickle over the catalyst. The catalysts are used in the amounts which are usual for this hydrogenation. Raney catalysts are used for example in amounts of 5 to 25% by weight with reference to phthalic acid.

The reaction temperature and pressure depend to a great extent on the catalyst and solvent used. The hydrogenation is usually carried out at 120° to 300° C., particularly from 150° to 250° C. It is advantageous to supply the hydrogen under superatmospheric pressure, for example at a pressure of 50 to 350 atm. gauge; the process may however also be carried out at atmospheric pressure.

Addition of the undesired isomers advantageously is made in an amount approximately corresponding to the relative proportion of the isomers to be expected in a conventional hydrogenation. For example if under the reaction conditions $a\%$ of the cis-form and $100-a\%$ of the trans-form of the hexahydrophthalic acid in question would be obtained in a conventional hydrogenation, the amount $x$ of the cis-form which it is advantageous to add when desiring to prepare the transform may be obtained from the equation $a: (100-a)=x:100$, so that $x$ has a value of $$\frac{100 \cdot a}{(100-a)}\%$$

with reference to the hexahydrophthalic acid to be expected or $$\frac{100 \cdot a}{(100-a)} \cdot \frac{172}{168}\%$$

by weight with reference to phthalic acid used, and conversely the amount $y$ of the trans-form to be added when it is desired to obtain the cis-form is $$y = \frac{(100-a)}{a}\%$$

After the hydrogenation, the salt may be separated into the isomers, for example in the form of the calcium salts because, for example, calcium cis-isophthalate is much less soluble in water than the corresponding trans compound, and the hexahydrophthalic acid then set free from the salt, or the hexahydrophthalic acids may first be set free and the isomers then separated. Conversion of the salts into the free acids is effected by conventional methods, for example by adding acids, particularly mineral acids, for example hydrochloric acid, sulfuric acid or sulfur dioxide. An advantageous embodiment consists in using the phthalic acid to be hydrogenated or an acid salt of this acid for the precipitation of the hexahydrophthalic acid. When precipitation is effected with an acid salt, there is obtained in the first stage only an acid salt of the hexahydrophthalic acid which is converted in a second stage into the free hexahydrophthalic acid, while a solution of the acid salt of the phthalic acid is formed which may then immediately be used for stage one of the precipitation.

The following example will further illustrate the invention without limiting it.

*Example*

A mixture of 102.1 g. of dipotassium terephthalate (corresponding to 70 g. of terephthalic acid), 43.6 g. of cis-dipotassium hexahydroterephthalate, 200 cc. of water and 15 g. of Raney nickel is charged into a shaking autoclave. After flushing the autoclave with hydrogen, hydrogen is pumped in at a pressure of 50 atm. and the contents are heated for ten hours at 200° C., the pressure in the autoclave being maintained constant at 300 at. by pumping in further hydrogen. The reaction mixture is cooled and filtered. The catalyst is washed with warm water. The clear filtrate solution, which contains a mixture of the added cis-dipotassium hexahydroterephthalate and the trans-dipotassium hexahydroterephthalate formed, is then adjusted to a pH value of 3.2 by adding concentrated hydrochloric acid so that the trans-hexahydrophathalic acid is precipitated quantitatively as a white deposit. The reaction mixture is then diluted with water to 2000 cc. in order to keep the cis-hexahydroterephthalic acid completely in solution. The insoluble residue is filtered off and washed well with water at 40° C. After the filter residue has been dried, 69.4 g. of trans-hexahydroterephthalic acid is obtained having a melting point of 300° to 302° C. and an acid number of 650 (the theoretical value being 651). The trans-hexahydroterephthalic acid thus obtained undergoes no loss in weight when treated with chloroform and therefore does not contain any cis-hexahydroterephthalic acid.

Cis-hexahydroterephthalic acid having a melting point of 161° C. and an acid number of 651 may be obtained from the aqueous filtrate by extraction with chloroform or ether and evaporation of the solvent.

If the cis-hexahydroterephthalic acid is to be used for another batch, the filtrate is neutralized with potassium hydroxide and used again after the appropriate amount of dipotassium terephthalate has been added.

The terephthalic acid supplied is converted practically quantitatively into trans-hexahydroterephthalic acid, while the added cis-fraction remains unchanged.

If, for purposes of comparison, the hydrogenation of dipotassium terephthalate is carried out under the same reaction conditions as described above but without the addition of cis-dipotassium hexahydroterephthalate to the salt mixture to be hydrogenated, a total yield of 94.5% cis-trans-cyclohexane dicarboxylic acid-(1,4) having a cis-trans ratio of 28:72 is obtained after working up.

We claim:

1. In a process for the catalytic hydrogenation of a terephthalic acid salt to form the corresponding hexahydroterephthalic acid salt at a temperature of 120° C. to 350° C. and at a pressure of 50 to 350 atm. gauge, the improvement for selectively increasing the yield of the trans-geometric structure of the hexahydroterephthalic acid product which comprises: contacting said terephthalic acid salt with hydrogen for said catalytic hydrogenation after first having added thereto the cis-hexahydroterephthalic acid salt in an amount such that the ratio by weight of said added salt to the terephthalic acid salt reactant, calculated as their acids, corresponds approximately to the ratio by weight of the cis to trans products, calculated as their acids, obtained in the absence of said added salt.

2. A process as claimed in claim 1 wherein an alkali metal salt of each of said terephthalic acid and said hexahydroterephthalic acid is employed.

3. A process as claimed in claim 2 wherein the alkali metal is potassium.

References Cited

UNITED STATES PATENTS

| | | | |
|---|---|---|---|
| 2,828,335 | 3/1958 | Ferstandig et al. | 260—514 |
| 2,888,484 | 5/1959 | Dehm et al. | 260—514 |
| 3,027,398 | 3/1962 | Foohey | 260—468 |
| 3,162,679 | 11/1964 | Rylander et al. | 260—514 |

OTHER REFERENCES

Emmett, "Catalysis," vol. V, page 210 (1957).

LORRAINE A. WEINBERGER, *Primary Examiner.*

RICHARD K. JACKSON, *Examiner.*